Figure 2:
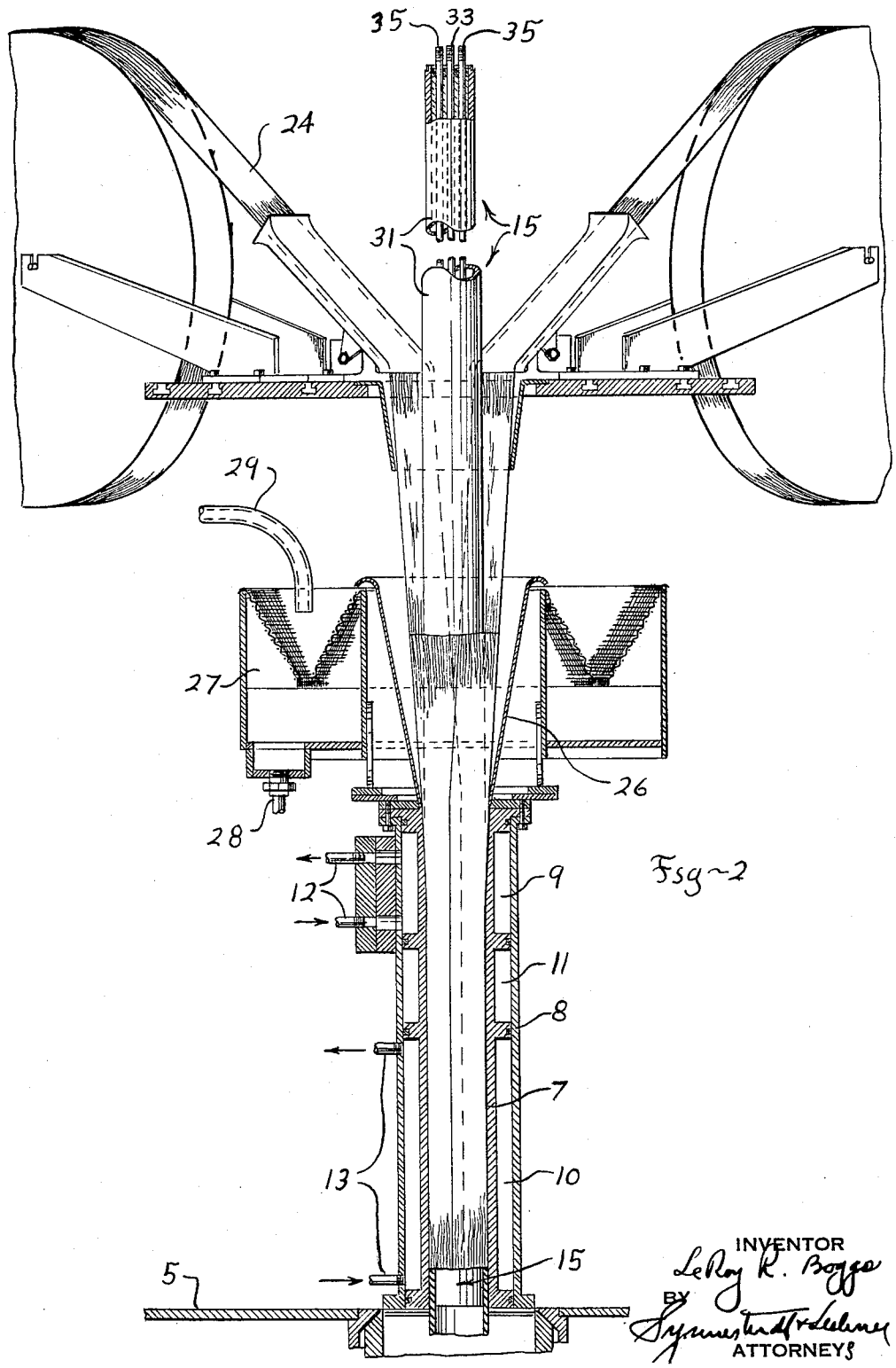

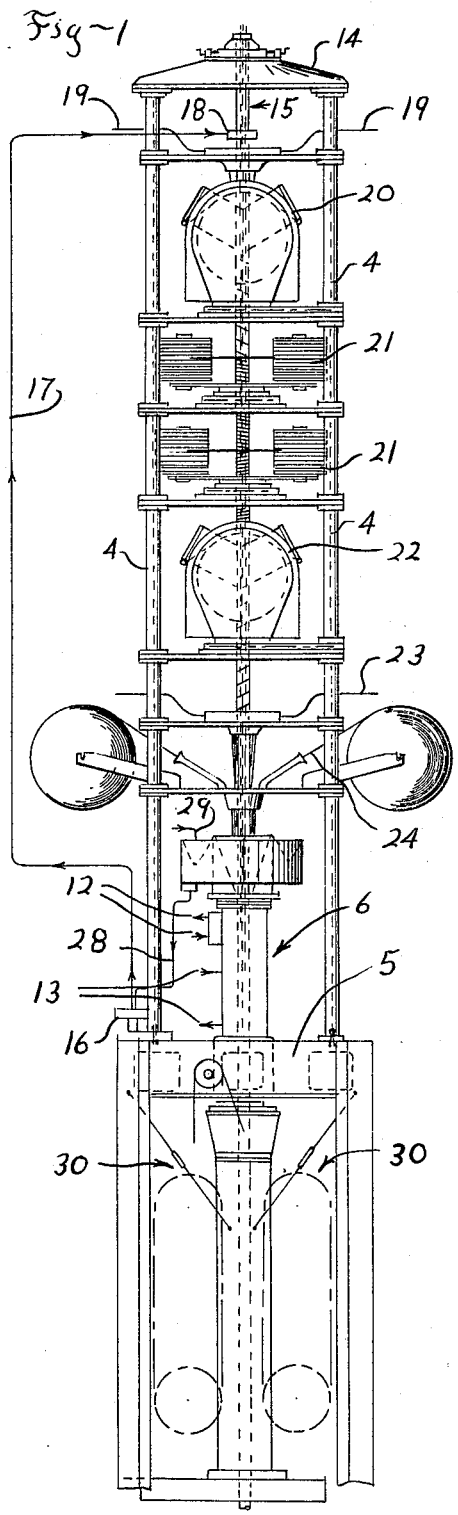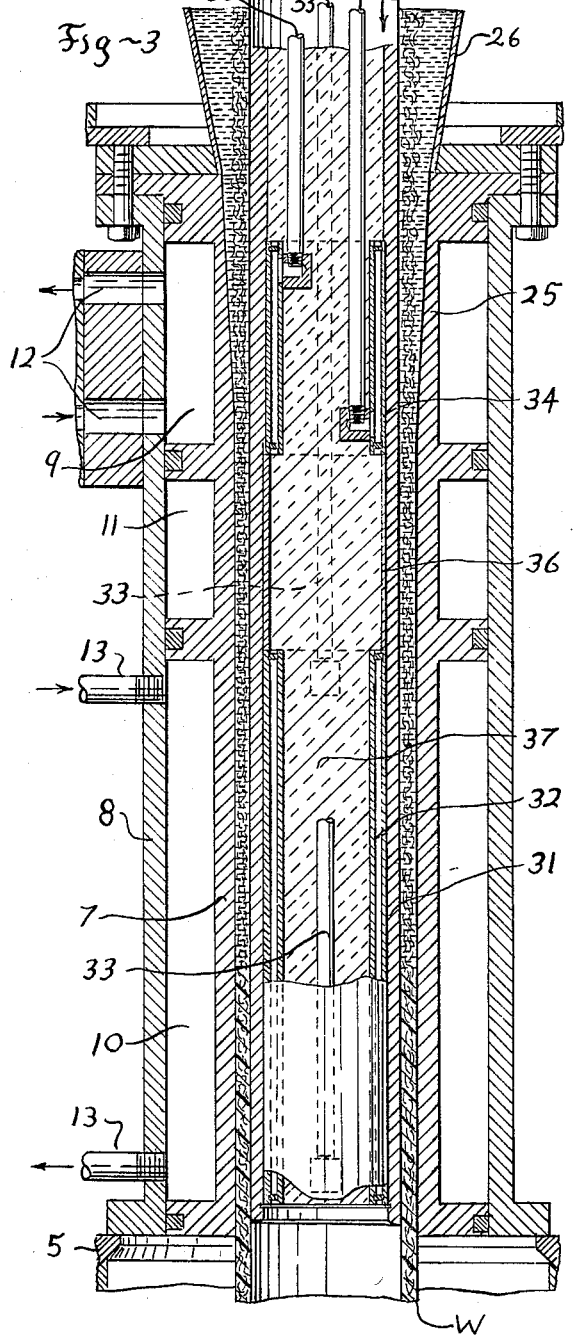

3,277,531
CORE FOR MAKING TUBULAR RESIN ARTICLES
Le Roy R. Boggs, Bristol, Tenn., assignor to Universal Moulding Fiber Glass Corp., Bristol, Va., a corporation of Delaware
Filed Mar. 20, 1964, Ser. No. 353,525
6 Claims. (Cl. 18—14)

This invention relates to the production of tubular articles from resin materials and is particularly concerned with the production of tubular articles from resin materials which are initially liquid but heat hardenable, for instance the well-known polyester type of laminating resins.

As an example of this general type of operation for making tubular articles, reference is made to my copending applications Serial Nos. 44,050 filed July 20, 1960, now patent 3,185,603; 169,908, filed Jan. 30, 1962 and 299,636, filed Aug. 2, 1963, in each of which there is disclosed a technique for making a tubular article in which the liquid heat hardenable resin material is fed along with fiber reinforcement into and through an annular forming passage provided between a die structure and a core structure, the resin material being heated while it is passing through the annular passage, in order to solidify the resin, so that the article emerging from the annular forming passage is a solid article.

The present invention is especially concerned with the structure of a core for use in an operation of the type referred to above.

In considering certain of the objects and advantages of the invention, it is first noted that in an operation of the kind referred to above resin material is brought into contact with the core structure in the region or zone in advance of the entrance end of the forming passage, and in that region and in the entrance end of the passage it is important to maintain a temperature sufficiently low to preclude any appreciable setting or curing of the resin material. This is preferably accomplished by the provision of means for cooling the resin in the entrance end portion of the annular forming passage. For this purpose it is desirable to provide a cooling means for the core in that region. In addition, for the purpose of hardening or curing the resin it is desirable to provide means for heating the core in a zone downstream from the entrance end portion of the forming passage.

With the foregoing desirable factors in mind, the present invention provides an improved core structure preferably incorporating annular containers for a cooling medium and also for a heating medium, these containers being arranged within the core respectively adjacent the entrance end portion of the forming passage and also in a zone downstream from the cooling zone. By provision of these containers or "canisters" the problem of providing heating and cooling chambers within the core is greatly simplified, because the containers may be fabricated separately from the core and merely telescoped or slid into the core. The connections for each container for cooling medium or heating medium may also be attached prior to insertion of the containers into the core and this also greatly facilitates the matters of construction and assembly.

Another aspect of the invention is concerned with the fact that when employing annular containers or canisters, there is a central or interior hollow within the core in which air may circulate; and in a vertical arrangement, as is preferred for most purposes, with the heating zone below the cooling zone and also below the region in which the resin is brought into contact with the core, the natural air circulation tends to carry the heat from the heating zone upwardly through the cooling zone and thence also upwardly to the zone in the core lying adjacent to the region where resin is applied to the exterior surface of the core, and this tends to heat the core and thus the resin on the exterior surface sufficiently to undesirably initiate curing or hardening thereof prior to the time the resin reaches the curing zone in the forming passage. To meet this problem, the invention also contemplates infilling the interior hollow of the core, especially in the region of the cooling zone or cooling canister with a porous resin material or foam, so as to block air circulation within the core from the heating zone upstream to the cooling zone and to the region above the cooling zone. Most advantageously the foam is arranged to infill the entire cavity within the core, this being desirable not only to prevent the air circulation referred to but also to encase and insulate the connections for the heating and cooling media which must be extended downwardly from the top of the core through the hollow interior and to the cooling and heating canisters.

How the foregoing and other objects and advantages are attained will appear more fully from the following description referring to the accompanying drawings which illustrate the preferred embodiment of the invention and in which:

FIGURE 1 is a somewhat diagrammatic side elevational view of an apparatus for forming tubular articles generally in accordance with the disclosure of application 299,636 above identified;

FIGURE 2 is an enlarged view of portions of the equipment shown in FIGURE 1 and incorporating the improved core structure of the present invention, parts here being shown in vertical section so as to illustrate the core lying within the die; and FIGURE 3 is a still further enlarged vertical sectional view of portions of the die and core structure, showing the cooling and heating canisters within the core structure, the connections for heat transfer medium, and the porous resin material above referred to.

In connection with the description of FIGURE 1 just below, it is noted that that figure corresponds to FIGURE 1 of applicant's copending application Serial No. 299,636. Many details of the construction of the machine there shown need not be considered herein as they form no part of the present invention per se and such details may be found in the copending application referred to, but there is here given a brief description of the arrangement of the apparatus and of its operation as shown in FIGURE 1.

A tower structure made up of posts 4 is provided and at the level of the deck indicated at 5 a die structure generally indicated at 6 is mounted, this die structure comprising an inner tubular part 7 (see FIGURES 2 and 3) and a surrounding jacket 8 which is partitioned to provide a cooling zone 9 and a heating zone 10, separated by a dead space 11. Cooling medium is circulated through the annular chamber 9 by connections indicated at 12, and heating medium is circulated through the chamber 10 by connections 13.

Suspended from the cap structure 14 shown at the top of FIGURE 1 is a core structure generally indicated at 15 which extends downwardly all the way to and through the central cavity or passage in the die 6, the lower end of the core terminating adjacent to the lower end of the die structure, as is clear from FIGURES 2 and 3. This core structure cooperates with the die structure to define an annular passage through which resin material and reinforcement such as glass fiber reinforcement are fed or passed.

The feed system for the resin and fiber reinforcement includes a resin pump diagrammatically indicated at 16 which delivers resin through the connection 17 to a device 18 surrounding the core near the upper end thereof and providing for delivery of a film or stream of liquid resin material to the surface of the core, which stream of resin flows downwardly on the core to and into the annular passage between the die and core. Various parts of the fiber reinforcement are laid upon the core and thus become impregnated with the liquid resin material of the downflowing stream. For example rovings may be fed to the core and positioned longitudinally thereof, such rovings being indicated at 19 it being understood that a multiplicity of such rovings would ordinarily be fed from various positions around the core. Strips of woven or matted fibers may also be wound upon the core as indicated at 20. Additional rovings may be helically wound from the spools shown at 21. Additional helical strips may be applied as indicated at 22. A further layer of longitudinally extending rovings 23 may also be applied and finally strips shown at 24 may be applied longitudinally. Whatever form or pattern of reinforcement is employed, they all move together down the outer surface of the core and ultimately enter the upper end of the annular forming passage between the die and core in impregnated condition.

Attention is now called to the fact that as best shown in FIGURE 3, the entrance end of the die cavity, in the region indicated at 25, is flared or tapered to an enlarged inlet opening. This is arranged in order to provide an annular passage which has an inlet end portion flaring to an enlarged inlet opening. As a result of this the entrance of the impregnated reinforcements into the inlet end of the forming passage tends to exert a compressing action on the impregnated reinforcement thereby expelling air and gas bubbles upstream and also expelling a certain amount of the resin which latter is received in the reservoir best shown at 26 in FIGURE 2. It will be understood that it is contemplated that an excess of liquid resin always be fed through the system, so that there will be assurance that sufficient resin will be present to completely fill the forming passage, without the presence of any voids or porosity. The accumulating excess resin fills the reservoir 26 and overflows into the chamber 27 from which the resin is again delivered to the pump 16 through the connection 28. Makeup resin is added to the system as indicated at 29.

The impregnated fiber reinforcements pass downwardly into the forming passage (see FIGURE 3) and after attainment of curing temperature in the zone or region of the heating jacket 10, the resin hardens and the piece being formed, indicated at W in FIGURE 3, emerges from the lower end of the annular forming passage in solid condition and is drawn downwardly by means of the puller mechanism advantageously comprising a pair of crawler tread devices indicated generally at 30 in FIGURE 1.

It should be understood in considering the present description that where reference is made to an annular forming passage, it is not intended to limit the cross sectional shape of that passage to a circular form. The passage may be of any desired cross sectional shape, either circular or angular.

The improved core structure provided according to the present invention comprises a tubular core tube indicated at 31. In the region or zone corresponding to the heating chamber 10 of the die, the core is provided internally with an annular container or canister 32 adapted to be slid or telescoped into the core tube 31 and having connections 33—33 for circulation of a heating medium. These connections 33 extend all the way up through the interior hollow of the core tube to the upper end (see FIGURE 2), at which point the connections may be associated with supply means for delivering a heat transfer medium, for instance steam into the canister 32, and for withdrawing condensate therefrom.

Above the heating canister 32, in the region corresponding to the die chamber 9 of the die structure, the core contains another canister 34 which is again of annular shape adapted to be telescoped or slid into the core tube, and this canister is provided with connections 35 by means of which cooling medium may be circulated through the chamber in the canister 34. It will be noted that the two connections 35 for the cooling medium are positioned in a diametral plane at right angles to the connections 33 for the heating canister 32. In this way clearance between the connections for the two canisters is provided for. The two canisters are separated within the core tube by means of a spacer sleeve 36 in the region of the dead space 11 in the surrounding die structure.

FIGURE 3 is also provided with cross hatching in the interior hollow within the core, in order to illustrate a porous or foamed resin material 37 infilling all of the space within the core, preferably from top to bottom thereof. In accomplishing this infilling of the interior of the core, one end of the core may conveniently be closed and the ingredients of a suitable resin composition introduced which, upon mixing, will foam and develop porosity and also set or solidify, so that the heating and cooling connections are encased in the foam resin material and the entire interior hollow within the canisters and within the remaining parts of the core are completely infilled. A suitable material for this purpose is foamed polyurethane resin.

It will be understood that effective blocking of air circulation from the lower heated portion of the core to the upper portions of the core may be achieved by providing a blocking means such as the resin foam only in the region of the cooling canister 34, but in the preferred embodiment, the foam is extended substantially throughout the interior of the core because this also aids in insulating the heating connections from the cooling connections and further aids in insulating the heating connections from the core tube itself in the upper regions thereof where it is desired to maintain relatively low temperature at the external core surface so as to avoid any appreciable setting or curing of resin constituents in those regions of the core.

Water at ordinary supply temperature may readily be employed for cooling purposes, or if desired a refrigerated cooling medium may be used.

It will also be understood that the infilling of all or a part of the core with the resin foam will be effective to avoid transfer of heat from the lower heated region of the die and core structure to the upper region of the core, regardless of the specific mode of heating employed to solidify the resin in the lower portion of the annular forming passage.

The provision of the annular heat transfer canisters adapted to be telescoped within a hollow core constitutes a highly effective system for delivering the desired heat exchange media to the desired localized zones within the core. This arrangement makes it unnecessary to build complex chamber and partition structures within the core tube itself, which at best is difficult to accomplish especially in a manner to avoid leakage. Moreover the use of the separate canisters makes it practical to remove and replace canisters either in the event of leakage developing or in the event it is desired to alter the location or size of the cooling and heating zones in order to adapt the equipment to the treatment of articles of different thickness or to adapt the equipment to operation at different rates.

I claim:

1. Apparatus for use in making tubular articles from liquid heat hardenable resin materials, comprising a forming device having a cavity therein, a core structure in said cavity cooperating therewith to define an annular forming passage through which the resin material is passed, the core structure comprising a tube, means for cooling the core in a zone toward the entrance or upstream end of the forming passage including an annular canister for a cooling medium fitted inside the core tube, and means for heating the core in a zone beyond the cooling zone including means providing a heat transfer chamber in the core tube and circulation connections for a heat transfer medium connected with said chamber and extended therefrom upstream radially inwardly of the annular canister for the cooling medium.

2. Apparatus according to claim 1 in which the means providing a heat transfer chamber comprises an annular canister fitted inside the core tube.

3. Apparatus for use in making tubular articles from liquid heat hardenable resin materials, comprising a forming device having a cavity therein, a core structure in said cavity cooperating therewith to define an annular forming passage through which the resin material is passed, the core structure comprising a tube, means for cooling the core in a zone toward the entrance or upstream end of the forming passage including an annular container for a cooling medium fitted inside the core tube, and means for heating the core in a zone beyond the cooling zone including an annular canister for a heating medium fitted inside the core tube and spaced from the cooling container.

4. Apparatus for use in making tubular articles from liquid heat hardenable resin materials, comprising a forming device having a cavity therein open at the top and bottom thereof, a core structure in the cavity cooperating therewith to define an annular forming passage through which the resin material is passed, the core structure comprising a tube extended above the forming device, means for feeding liquid heat hardenable resin material to the core tube at a point above the forming device to move downwardly on the core tube into the annular forming passage, means defining an annular chamber for a cooling medium in the core tube in a zone toward the entrance or upstream end of the forming passage, means for heating the core tube in a zone downstream from the cooling zone, and porous resin material infilling the interior of the core tube at least in the region of the cooling means.

5. Apparatus for use in making tubular articles from liquid heat hardenable resin materials, comprising a forming device having a cavity therein, a core structure in said cavity cooperating therewith to define an annular forming passage through which the resin material is passed, the core structure comprising a tube, means for cooling the core in a zone toward the entrance or upstream end of the forming passage including an annular container for a cooling medium fitted inside the core tube, means for heating the core in a zone beyond the cooling zone including an annular container for a heating medium fitted inside the core tube and spaced from the cooling container, and porous resin material infilling the interior of the core radially inwardly of the annular containers.

6. Apparatus for use in making tubular articles from liquid heat hardenable resin materials, comprising a forming device having a cavity therein open at the top and bottom thereof, a core structure in the cavity cooperating therewith to define an annular forming passage through which the resin material is passed, the core structure comprising a tube extended above the forming device, means for feeding liquid heat hardenable resin material to the core tube at a point above the forming device to move downwardly on the core tube into the annular forming passage, means for cooling the resin material in the forming passage in a zone toward the entrance or upstream end thereof, means for heating the resin material in a zone downstream from the cooling zone, the core tube having an interior hollow extended upwardly therein from the heating zone at least through the cooling zone, and means closing or blocking said interior hollow at least in the region of the cooling zone, said blocking means comprising porous resin material infilling the interior hollow of the core at least in the region of the cooling zone.

References Cited by the Examiner

UNITED STATES PATENTS

| | | |
|---|---|---|
| 1,650,687 | 11/1927 | Bond. |
| 2,987,765 | 6/1961 | Cichelli. |
| 3,024,494 | 3/1962 | Szpila _____ 18—14 X |
| 3,068,133 | 11/1962 | Cilker et al. _____ 156—187 X |
| 3,083,130 | 3/1963 | Strandquist _____ 156—498 X |
| 3,159,515 | 12/1964 | Dunlap et al. _____ 156—498 X |

WILLIAM J. STEPHENSON, *Primary Examiner.*